Oct. 8, 1968   J. R. TABOR   3,404,535
TUNNELING MACHINE
Filed Sept. 29, 1965   3 Sheets-Sheet 1
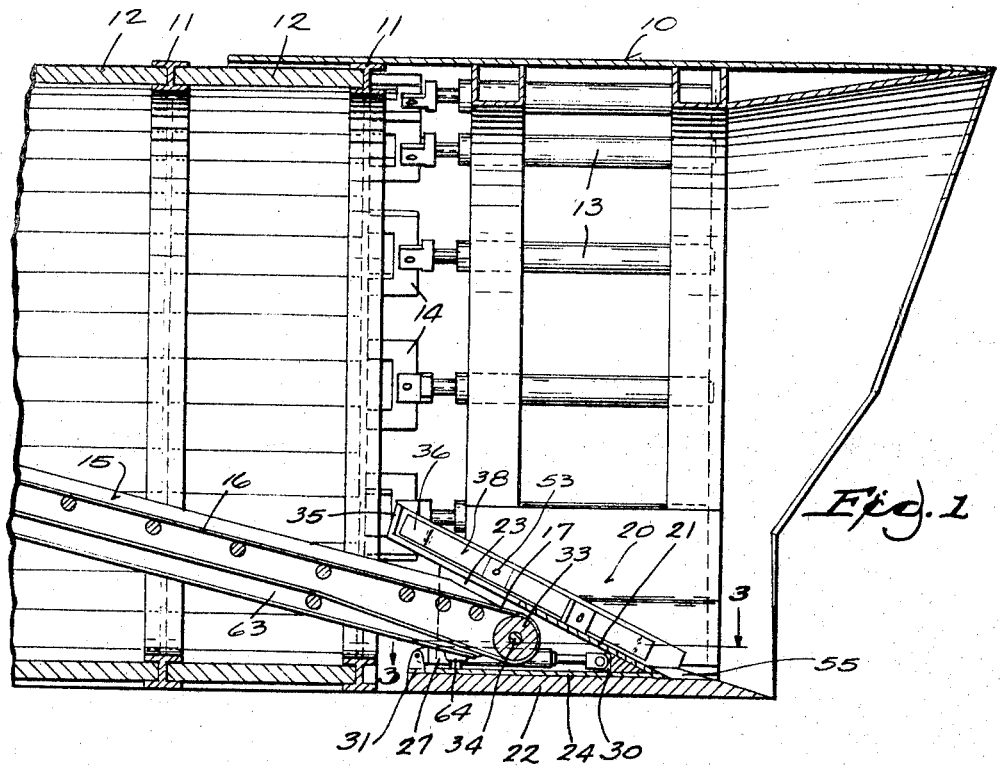
Fig. 1
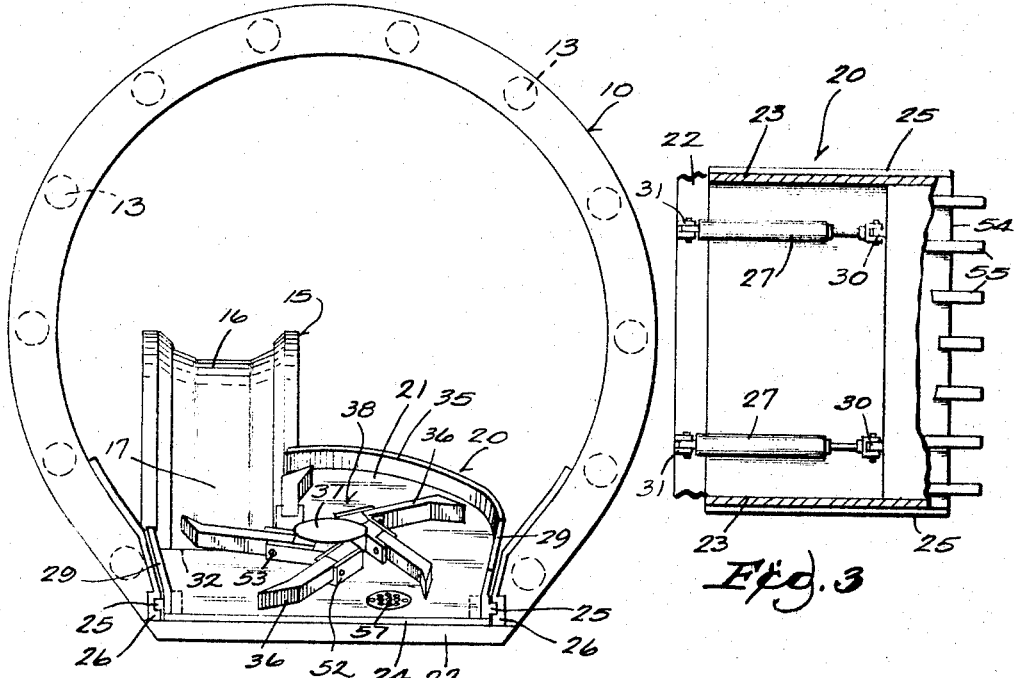
Fig. 2
Fig. 3
INVENTOR
JOHN R. TABOR
BY Wheeler, Wheeler & Wheeler
ATTORNEYS Oct. 8, 1968  J. R. TABOR  3,404,535
TUNNELING MACHINE
Filed Sept. 29, 1965  3 Sheets-Sheet 2

INVENTOR
JOHN R. TABOR
BY Wheeler, Wheeler & Wheeler
ATTORNEYS

United States Patent Office 3,404,535
Patented Oct. 8, 1968

3,404,535
TUNNELING MACHINE
John R. Tabor, 3400 Spruce St., Racine, Wis. 53403
Filed Sept. 29, 1965, Ser. No. 491,200
7 Claims. (Cl. 61—85)

ABSTRACT OF THE DISCLOSURE

This disclosure relates to a tunneling machine having a shield with a loading conveyor and a spoil conveyor. The loading conveyor has an apron with a notch above the input end of the spoil conveyor. Sweep arms move across the apron to convey spoil on the apron to the notch and deposit spoil onto the spoil conveyor. The loading conveyor is powered to advance and retract bodily with respect to the shield.

---

This invention relates to a tunneling machine having a shield with a spoil conveyor and a loading conveyor or wheel.

It is conventional in the art to tunnel through the earth and to employ at the head end of the tunnel a power operated tunneling machine shield which is pushed through the earth incident to cutting spoil from the tunnel face. This spoil is then removed on conveyors such as mine cars, belt conveyors, etc.

In accordance with the present invention, the input end of the spoil conveyor is disposed in the shield and in association with a loading conveyor having sweep arms which load or feed spoil cut from the tunnel face onto the spoil conveyor.

The spoil can be cut simply by the forward progress of the shield. Loose flowable spoil thus separated from the earth formation through which the tunnel is being formed may simply flow inwardly of the shield and onto the apron of the loading conveyor. More firmly packed spoil may be cut manually from the face. Alternatively, it may be loosened by blasting, or it can be excavated by a rotary wheel or like mechanical device. No matter how cut, the spoil will be deposited onto the loading conveyor apron where it is picked up by sweep arms and deposited on the input end of the spoil conveyor for removal from the tunnel.

In preferred embodiments of the invention, the loading conveyor has an upwardly and rearwardly inclined apron to receive the input end of the spoil conveyor beneath its trailing edge. The incline of the apron is also advantageous to reduce the angle between the plane of the apron and the plane of spoil repose.

The loading conveyor is desirably provided with power means by which it is advanced and retracted with respect to the tunnel face independently of movement of the shield with respect thereto. In this manner the apron functions as a power loader, shovel or scoop, to facilitate loading the spoil into the spoil conveyor. For this purpose the leading edge of the apron is desirably provided with a sharp cutting edge with teeth.

The power actuated loading conveyor of the present invention is useful not only for removing spoil, but also functions as a convenient thrust platform for the power actuation of breasting supports and face boards. The incorporation of the loading conveyor on the shield makes it unnecessary to provide separate thrust apparatus for these purposes.

Summary of the invention

The tunneling machine has a loading conveyor comprising a star wheel having spokes which sweep over the conveyor apron to load spoil onto the spoil conveyor which has its input end disposed below the apron at a corner notch cut out of the apron. Accordingly, the spoil is discharged by gravity onto the input end of the spoil conveyor as the sweep arms traverse the notch. The arms are desirably pivotally attached to the hub of the star wheel to over-ride obstructions on the apron and hence relieve stresses on the wheel driving apparatus. The loading conveyor is powered to advance and retract bodily with respect to the shield.

Other objects, features and advantages of the invention will appear from the following disclosure in which:

FIG. 1 is a vertical cross section taken through a tunneling machine embodying the present invention, the machine shield being disposed at the head end of a tunnel casing.

FIG. 2 is a front elevation of the tunneling machine of FIG. 1.

FIG. 3 is a fragmentary cross section taken along the line 3—3 of FIG. 1.

Figure 4:
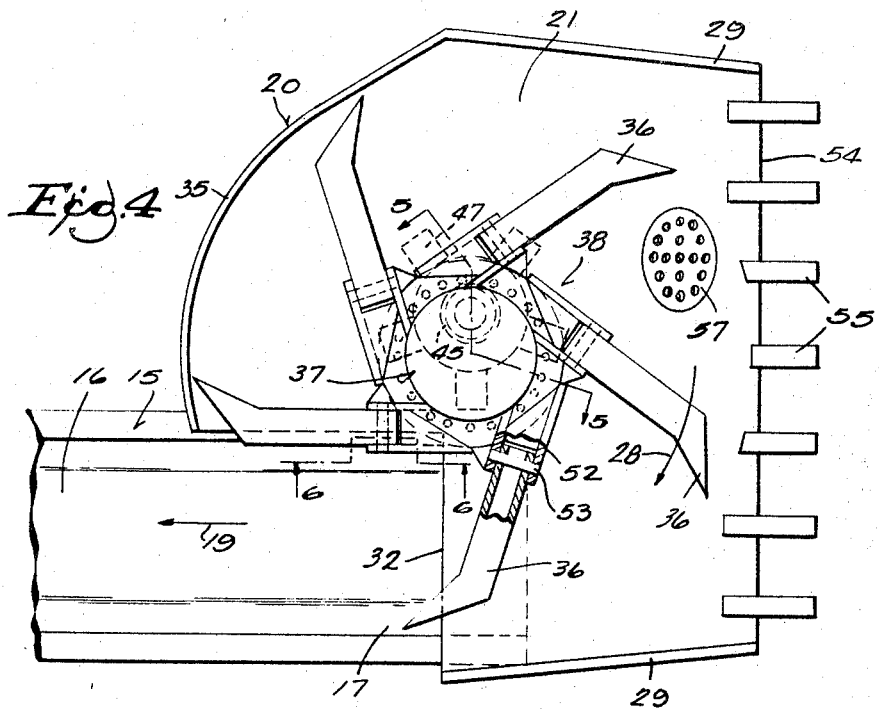
FIG. 4 is a plan view of the loading conveyor and the input end of the spoil conveyor, disassociated from the shield.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The tunneling shield 10 is generally conventional. As is also shown in my copending application Ser. No. 374,004, filed June 10, 1964, as the shield is advanced a tunnel casing typically consisting of curved H-beams 11 and wooden lagging 12 is erected within the tail end of the shield 10. The shield 10 is provided with thrust jacks 13 which are periodically actuated to thrust the shield 10 forwardly through the earth. The jacks 13 are provided with shoes 14 which bear against the most recently emplaced beam 11.

As the shield moves forwardly, it will separate the spoil from the earth formation and will tend to cut the spoil from the tunnel face. If the earth strata through which the tunnel is being formed is relatively loose and flowable, the spoil may simply flow downwardly within the shield as soon as the shield advances therethrough. If the earth formation is more compact, it may be necessary to blast the spoil loose from the tunnel face or dislodge spoil by the use of pneumatic hammers or the like, or to use a cutting wheel of the type shown in my copending application Ser. No. 474,351, filed July 23, 1965. In any event, spoil removed from the tunnel face will flow rearwardly and will occupy a plane of repose generally indicated by the reference character 18 in FIG. 7. The angle will vary somewhat, depending on spoil composition, water content, etc.

A spoil conveyor 15, which typically includes an endless power-driven belt 16, removes the spoil from the shield and conveys it rearwardly in the direction of arrow 19 for deposit in mine cars or the like, as shown in my copending application Ser. No. 474,351 aforesaid. According to the present invention, the input end 17 of the spoil conveyor 16 is coupled to a loading conveyor 20 which has an upwardly and rearwardly inclined floor or apron 21 which extends completely across the floor 22 of the shield 10. The apron 21 is mounted at its edges on wedge-shaped side brackets 23 which extend upwardly from floor plate 24, to define the inclined position of the apron 21. Along its lateral edges conveyor 20 is desirably provided with tongued side rails 25 which are guided for fore and aft movement in the grooved guideways 26 provided along the sides of the shield 10 (FIG. 2). Alternatively, the conveyor 20 could have crawler or wheel mounts independently of the shield.

Th conveyor 20 is powered in its fore and aft movement, independently of the movement of the shield 10, for example, by hydraulic jacks 27 which are coupled on brackets 30 to the conveyor 20 and are coupled on brackets 31 to the shield floor 22. This provides for considerable adjustment in the location of the conveyor apron with respect to the leading edge of the shield. It can be positioned close to the shield leading edge when the spoil is compact and has a large angle of repose, and can be positioned farther away from the shield leading edge when the spoil is loose or watery and has a small angle of repose.

Apron 21 is provided with a corner notch 32 beneath which is disposed the input end 17 of the spoil conveyor 15. Input end 17 includes a belt supporting roller 33 having a shaft 34 journaled for rotation on the conveyor side plates 63. Conveyor 15 is coupled to the loading conveyor 20 on a ball joint 64, which permits articulation in all planes. Accordingly, as the conveyor 20 is moved fore and aft by the hydraulic motors 27, the spoil conveyor 15 will also be moved fore and aft by reason of their interconnection. The conveyor input end 17 will always maintain its same position relative to the apron notch 32.

The loading conveyor 20 is provided with a rim 35 along its rear edge and rims 29 along its sides. These confine spoil on the apron 21.

Figure 5:
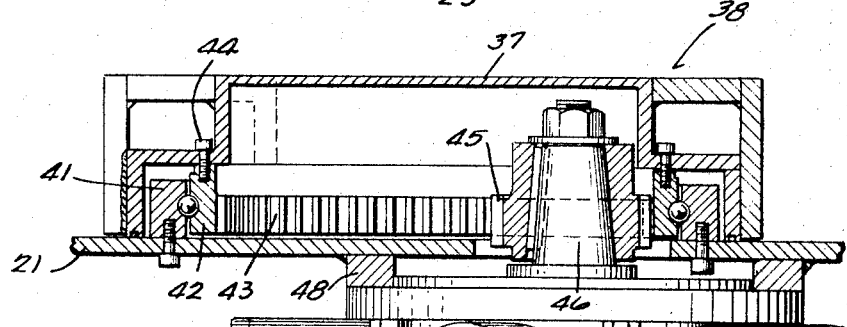
FIG. 5 is a fragmentary cross section taken along the line 5—5 of FIG. 4.

Spoil is conveyed across the apron 21 and onto the input end 17 of the conveyor 16 in the direction of arrow 28 by the sweep arms 36 which are detachably connected to the hub 37 of a rotary star wheel 38. Arms 36 desirably comprise spokes of the star wheel. Wheel 38 has its axis of rotation substantially at the center of the apron 21 and offset laterally from notch 32. Apron 21 is provided with an annular bearing rib 41 (FIG. 5) which provides an outer race for an anti-friction bearing including an inner race 42 having ring gear teeth 43 cut on the inner surface thereof. Inner race 42 is attached by the bolts 44 to the hub cover 37. Ring gear 43 is driven by a pinion 45 mounted on the drive shaft 46 of a hydraulic motor 47 which is fastened to the undersurface of the apron 21 on the mounting boss 48. Hydraulic fluid is supplied to the motor 47 through the lines 51.

When the motor 47 is actuated, the hub 37 of the rotary star wheel will turn to sweep its arms 36 across the apron 21. These will convey spoil over the apron 21, to the notch 32. The spoil will drop by gravity through the notch 32 onto the input end 17 of the conveyor 16, from whence it will be conveyed rearwardly.

Figure 6:
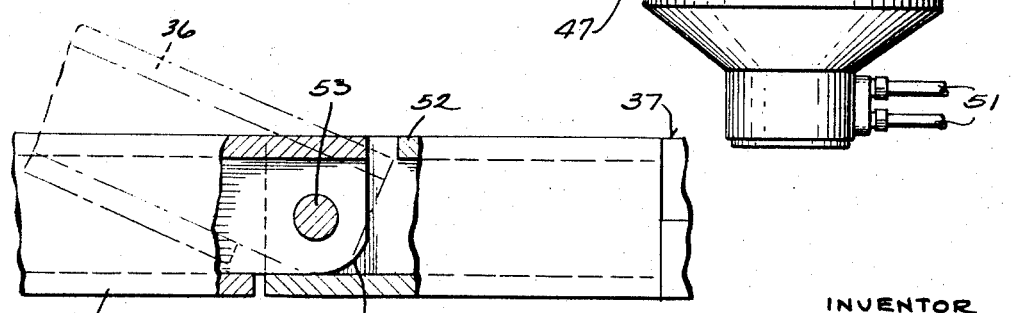
FIG. 6 is a fragmentary cross section taken along the line 6—6 of FIG. 4.

As best shown in FIGS. 4 and 6, each arm 36 is detachably and pivotally mounted on the hub 37 on stub sockets 52. The sockets 52 are spanned by pintles 53 on which the arms 36 may pivot upwardly, thus to over-ride obstructions on the apron such as rocks, etc., which might otherwise block arm movement and thus impose unwanted strain on the driving mechanism. To facilitate pivotal movement of the arms 36, their butt ends are rounded at 50, on an arc about the axis of the pintles 53.

Motor 47 is reversible. Accordingly, if a rock is caught in the wheel, its spokes may be worked backward and forward to help dislodge the rock. Wheel speed is desirably in the range of 1–8 r.p.m.

Apron 21 has the general configuration of a shovel blade, the leading cutting edge 54 of which is desirably provided with teeth 55. Accordingly, when the shield is advanced under the thrust of its hydraulic jacks 13, the cutting edge 54 and teeth 55 will function to cut and dislodge spoil from the tunnel face. Alternatively or concurrently, the shield 10 may be stationary and the hydraulic jacks 27 actuated to advance the edge 54 and teeth 55 against the tunnel face.

Figure 7:
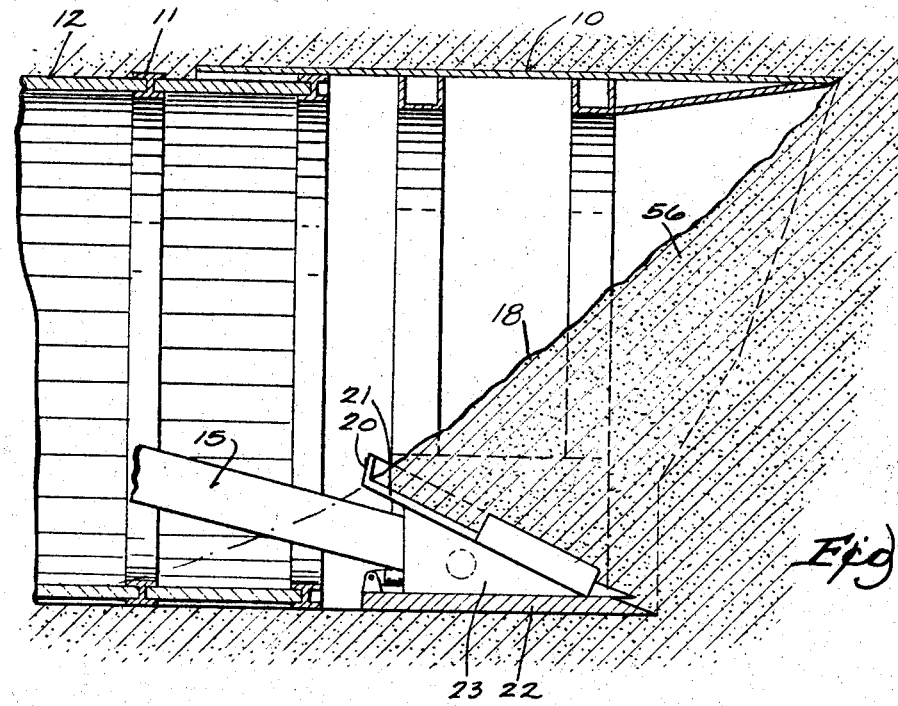
FIG. 7 is a diagrammatic illustration showing spoil reposing in the shield and its relation to the spoil conveyor and loading conveyor.

FIG. 7 illustrates how the inclined apron 21 of the loading conveyor 20 acts as a breasting support for the loosened spoil 56. Undue rearward flow of the spoil is impeded by the blocking effect of the upwardly tilted apron 21. The upward tilt, in effect, increases the angle between the plane of the apron 21 and the plane 18 of repose of the spoil. This angle will vary depending upon the composition and flowability of the earth through which the tunnel is formed.

If desired, a water drain 57 may be provided on apron floor 21. This drain may be connected by piping (not shown) to a water pump to remove water from the tunnel bottom, in the event the spoil has a high water content. This will help prevent washouts.

The loading conveyor 20 is adapted to receive spoil which flows down to it from the tunnel face. By actuating its power means, such as jacks 27, it can be advanced like a loader or shovel to clean out spoil ahead of it. The jacks may advance the cutting edge 54 of the apron 21 ahead of the front edge of the shield floor 22 to cut the spoil from the tunnel face and to deal advantageously with rocks, etc., which might impede forward movement of the bottom of the shield. In this manner, the apron, 21 may be worked to help control the grade of the tunneling machine.

Figure 8:
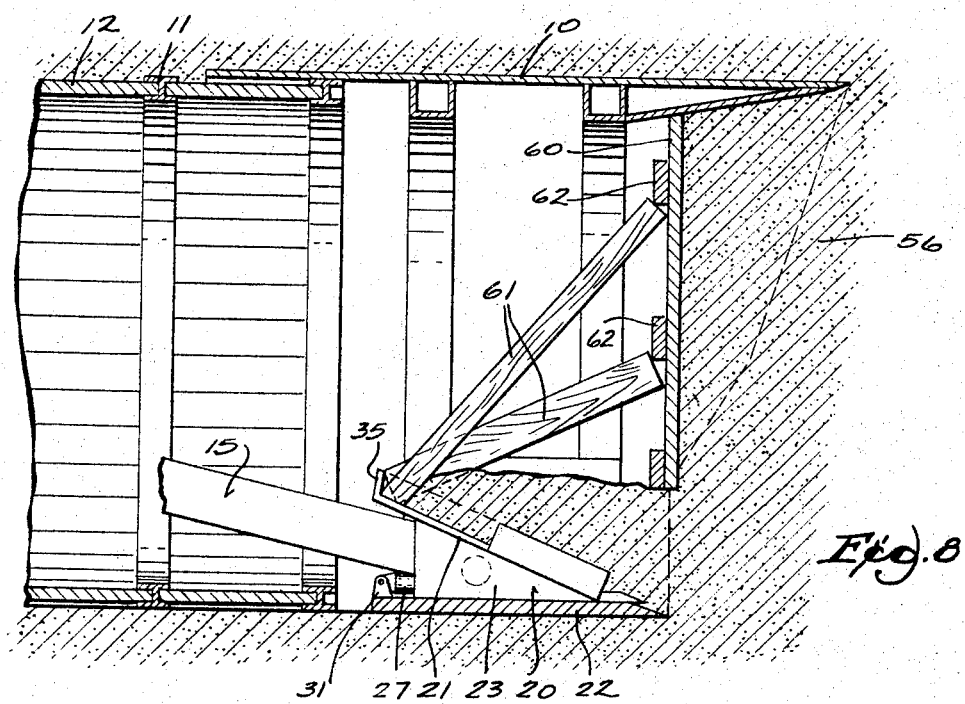
FIG. 8 is a diagrammatic illustration showing the loading conveyor in use as a thrust platform for breasting supports and face boards.

The use of the power actuated loading conveyor as a breasting jack is shown in FIG. 8. During periods of tunnel driving inactivity, removable face boards 60 may be positioned, as shown, to shore up the tunnel face to prevent cave-ins. The breasting jacks heretofore required to apply pressure to the face boards are rendered unnecessary in the device of the present invention. Struts 61 are simply lodged between the apron rim 35 and the cleats 62 on the face boards. Forward pressure on the cylinders 27 will be transmitted through the apron 21 and struts 61 to the boards 60 to breast the tunnel face.

I claim:
1. A tunneling machine comprising:
   a shield having power means to thrust it forwardly incident to removing spoil from the tunnel face,
   a spoil conveyor having an input end in said shield,
   and a loading conveyor associated with the input end of the spoil conveyor, said loading conveyor comprising:
      a spoil receiving apron intersecting the input end of the spoil conveyor, said apron having a notch beneath which the input end of the spoil conveyor is disposed,
      power driven sweep arms movable across said apron and over said notch to convey spoil on the apron to the said notch and deposit spoil through the notch onto said input end of the spoil conveyor.

2. The machine of claim 1 in which said loading conveyor further comprises a star wheel, said sweep arms comprising star wheel spokes.

3. The machine of claim 1 in combination with power means for advancing and retracting said apron with respect to the shield and independently of shield movement.

4. The machine of claim 1 in which said spoil receiving apron is inclined upwardly and rearwardly to increase the angle between the plane of the apron and the plane of spoil repose.

5. The machine of claim 1 in which said loading conveyor further comprises a star wheel having a hub, said sweep arms comprising star wheel spokes movably connected to said hub to over-ride obstructions on the apron.

6. The machine of claim 1 in which said loading conveyor further comprises a star wheel having a hub, said sweep arms comprising star wheel spokes extending outwardly from said hub, a ring gear fastened to said hub, a pinion engaging said ring gear and a motor for said pinion.

7. A tunneling machine comprising:
a shield having power means to thrust it forwardly incident to removing spoil from the tunnel face,
a spoil conveyor having an input end in said shield,
a loading conveyor coupled to the input end of the spoil conveyor,
thrust means reacting between the loading conveyor and the shield for advancing and retracting the loading conveyor independently of shield movement.

References Cited

UNITED STATES PATENTS

| 1,338,237 | 4/1920 | Mack | 61—84 |
| 1,917,170 | 7/1933 | Warner et al. | 61—85 |
| 2,752,143 | 6/1956 | Joy | 299—33 X |
| 2,772,871 | 12/1956 | Caine. | |
| 2,801,091 | 7/1957 | Joy | 299—68 X |
| 2,997,853 | 8/1961 | Kemper | 61—84 X |
| 2,353,094 | 7/1944 | Veneziano | 198—9 X |
| 2,696,288 | 12/1964 | Ball | 198—9 |

DAVID J. WILLIAMOWSKY, *Primary Examiner.*

DENNIS L. TAYLOR, *Assistant Examiner.*